(12) United States Patent
Coates et al.

(10) Patent No.: US 6,538,101 B2
(45) Date of Patent: Mar. 25, 2003

(54) PREPARING ISOTACTIC STEREOBLOCK POLY(LACTIC ACID)

(75) Inventors: Geoffrey W. Coates, Ithaca, NY (US); Tina M. Ovitt, Plymouth, MN (US)

(73) Assignee: Cornell Research Foundation, Inc., Ithica, NY (US)

( * ) Notice: Subject to any disclaimer, the term of this patent is extended or adjusted under 35 U.S.C. 154(b) by 0 days.

(21) Appl. No.: 09/957,666

(22) Filed: Sep. 21, 2001

(65) Prior Publication Data

US 2002/0055612 A1 May 9, 2002

Related U.S. Application Data

(60) Provisional application No. 60/242,470, filed on Oct. 24, 2000.

(51) Int. Cl.[7] .................. C08G 63/08; C08G 63/82
(52) U.S. Cl. ................. 528/354; 528/355; 528/357; 528/359; 528/361; 528/363
(58) Field of Search ................ 528/354, 357, 528/355, 359, 361, 363

(56) References Cited

U.S. PATENT DOCUMENTS

| 5,225,129 | A |   | 7/1993  | van den Berg ............. 264/85 |
| 5,235,031 | A |   | 8/1993  | Drysdale et al. ........... 528/354 |
| 5,310,865 | A |   | 5/1994  | Enomoto et al. ........... 528/361 |
| 5,430,125 | A |   | 7/1995  | Hori et al. ................. 528/354 |
| 5,440,007 | A | * | 8/1995  | Gross et al. ............... 528/354 |
| 5,883,199 | A |   | 3/1999  | McCarthy et al. .......... 525/437 |
| 5,885,829 | A |   | 3/1999  | Monney et al. ............. 435/325 |
| 6,316,590 | B1 |  | 11/2001 | Coates et al. .............. 528/357 |
| 6,376,643 | B1 | * | 4/2002 | Chang et al. .............. 528/354 |

OTHER PUBLICATIONS

*Macromolecules* (May 1, 1996) 29, pp. 3773–3777, Gross et al,"Stereochemical Control in the Anionic Polymerization of β–Butyrolactone Initiated with Alkali–Metal Alkoxides".*
*Macromolecules*, (Feb. 20, 1998) 31, pp. 1487–1494, ThaKur et al "Stereochemical Aspects of Lactide Stereo–Copolymerization Investigated by HNMR: A case of Changing Stereo Specificity".*
*Macromolecular Chemistry & Physics*, vol. 198, No. 4, pp. 1227–1238, M. Wisniewski et al, "Synthesis & Properties of (D)–and (L)–Lactide Stereocopolymers Using the System Achiral Schiff's Base/Al Methoxide as Initiator", May 2, 1997.*
Kricheldorf, H. R., et al., Macromolecules 21, 286–293 (1988).
Spassky, N., et al., Macromol. Chem. Phys. 197, 2627–2637 (1996).
Ovitt, T. M. and Coates, G. W., Journal of Polymer Sciences: Part A: Polymer Chemistry 38, 4686–4692 (2000).

* cited by examiner

*Primary Examiner*—P. Hampton-Hightower

(57) ABSTRACT

A stereospecific poly(lactic acid) is isotactic poly(lactic acid) having a number average molecular weight ranging from 10,000 to 200,000 grams per mole, with, on average, an equal number of poly (R) and poly (S) blocks where each block contains an average of 5 to 50 monomer units. Product was prepared by polymerizing rac-lactide in the presence of racemic catalyst consisting of:

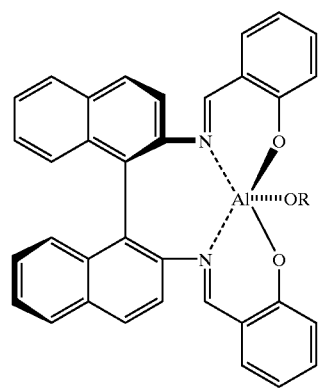

(II)

and the corresponding S-enantiomer or in the presence of racemic catalyst consisting of:

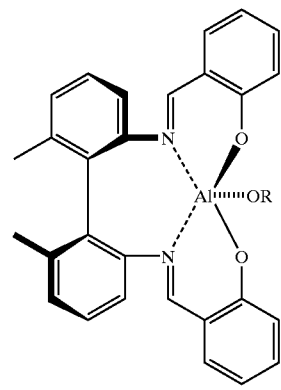

(III)

and the corresponding S-enantiomer, wherein R is $C_1$–$C_4$ alkyl which is straight chain or branched.

10 Claims, No Drawings

PREPARING ISOTACTIC STEREOBLOCK POLY(LACTIC ACID)

CROSS-REFERENCE TO RELATED APPLICATION

This application claims the benefit of U.S. Provisional Application No. 60/242,470, filed Oct. 24, 2000.

This invention is made at least in part with Government Support under National Science Foundation Career Award CHE-9875261. The Government has certain rights in the invention.

TECHNICAL FIELD

This invention is directed at an isotactic stereoblock poly(lactic acid) and to methods of making an isotactic stereoblock poly(lactic acid).

BACKGROUND OF THE INVENTION

Poly(lactic acid)s, PLAs, are considered to have utility for medical, agricultural, and packaging application due to their biocompatibility and biodegradability. In view of this, it is desirable to provide new stereospecific forms of poly(lactic acid)s and new methods of preparing known forms of poly(lactic acid)s.

A convenient synthetic route to PLAs is the ring-opening polymerization of lactide, the cyclic diester of lactic acid. A range of metal alkoxide initiators have been reported to polymerize lactide with retention of configuration. For example, these initiators have been reported to polymerize optically active (R,R)-lactide or (S,S)-lactide to produce isotactic poly(lactic acid). Moreover, these initiators have been reported to polymerize rac-lactide to produce amorphous, atactic polymers.

Heterotactic poly(lactic acid) is a stereospecific polymer that has alternating pairs of stereogenic centers in the main chain. This poly(lactic acid) and the method of making it are disclosed in U.S. patent application Ser. No. 09/707,980, filed Nov. 8, 2000 now U.S. Pat. No. 6,316,590.

Spassky, N., et al., Macromol. Chem. Phys. 197, 2627–2637 (1996) reported the kinetic resolution of racemic lactide (rac-lactide) with the methoxide variant of the R-enantiomer of catalyst used in the invention herein. The high melting material that formed is considered to have a tapered stereoblock microstructure, i.e., there was not a sharp distinction between blocks and there were effectively two blocks.

SUMMARY OF THE INVENTION

It has been discovered herein that by polymerizing rac-lactide in the presence of a racemic version of the catalyst used by Spassky, et al., that isotactic stereoblock poly(lactic acid) having several total blocks where each block contains several monomer units, is formed.

One embodiment herein, denoted the first embodiment, is directed to isotactic stereoblock poly(lactic acid) having a number average molecular weight ranging from 10,000 to 200,000 grams per mole, with, on average, an equal number of poly (R) and poly (S) blocks where each block contains an average of 5 to 50 monomer units.

Another embodiment herein, denoted the second embodiment, is directed to preparing isotactic stereoblock poly(lactic acid) of the first embodiment herein comprising polymerizing rac-lactide in the presence of a racemic catalyst consisting of:

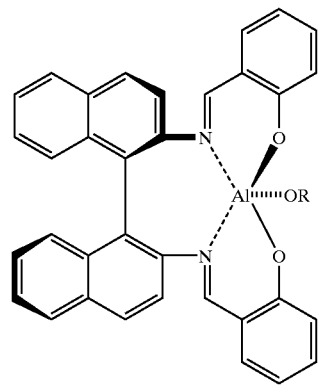

(II)

and the corresponding S-enantiomer, where R is $C_1$–$C_4$ alkyl which is straight chain or branched.

Still another embodiment herein, denoted the third embodiment herein, is directed to preparing isotactic stereoblock poly(lactic acid) of the first embodiment herein comprising polymerizing rac-lactide in the presence of a racemic catalyst consisting of:

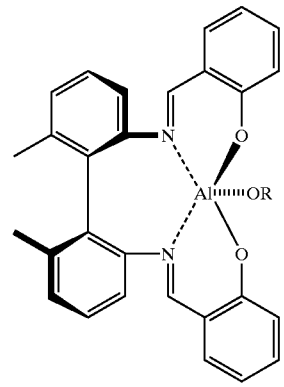

(III)

and the corresponding S-enantiomer, where R is $C_1$–$C_4$ alkyl which is straight chain or branched.

The number average molecular weights ($M_n$) herein are determined by gel permeation chromatography (GPO).

DETAILED DESCRIPTION

We turn now to the embodiment directed to isotactic stereoblock poly(lactic acid) having a number average molecular weight ranging from 10,000 to 200,000 grams per mole, with, on average, an equal number of poly (R) and poly (S) blocks where each block contains an average of 5 to 50 monomer units.

The stereoblock poly(lactic acid) prepared in Example I herein has a number average molecular weight of 22,600 grams per mole, with, on average, an equal number of poly (R) and poly (S) blocks where each block contains an average of 11 monomer units. The stereoblock (poly(lactic acid) prepared in Example II herein has a number average molecular weight of 29,560 grams per mole, with, on average, an equal number of poly (R) and poly (S) blocks where each block contains an average of 10 monomer units.

A structural formula for the isotactic stereoblock poly (lactic acid) of the first embodiment is:

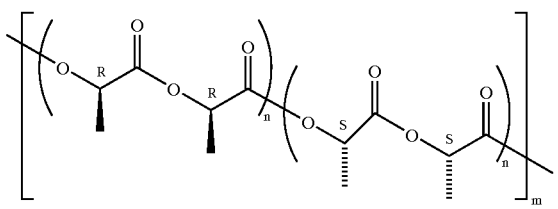
(I)

where n averages from 5 to 50 and m averages from 2 to 200. In the formula I, n is the average number of monomer units in a block, and m is the number of blocks.

We turn now to the second embodiment herein, that is the embodiment directed to preparing isotactic stereoblock poly (lactic) acid comprising polymerizing rac-lactide in the presence of a racemic catalyst consisting of:

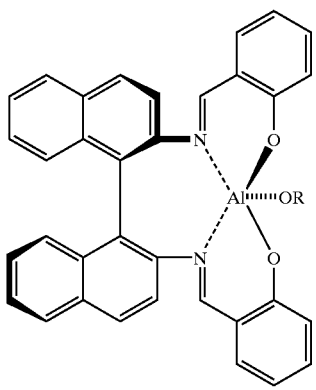
(II)

and the corresponding S-enantiomer, where R is $C_1$–$C_4$ alkyl which is straight chain or branched. In the catalyst, the R- and S-enantiomers are in a 1:1 ratio.

The rac-lactide, that is racemic lactide, is an admixture of (R,R)-lactide and (S,S)-lactide in a 1:1 ratio. It is commercially available. (R,R)-lactide has the formula:

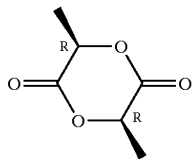

The catalyst (II) is prepared, for example, by synthesizing the R-enantiomer and the S-enantiomer and forming or using an admixture thereof in a 1:1 ratio. The R-enantiomer and the S-enantiomer of the ligand of the complex can be prepared according to the procedure described in Bermardo, K. D., et al., New J. Chem. 19, 129–131 (1995). Complex (II) and the corresponding S-enantiomer can be formed by heating solution of enantiomeric ligand and the appropriate aluminum alkoxide in toluene.

Examples of the catalyst are admixtures of corresponding R and S enantiomers of complex and include admixtures of complexes with the formula (II) where R is methyl or where R is isopropyl and the corresponding S-enantiomers.

For the polymerization, the mole ratio of monomer to aluminum can range, for example, from 10:1 to 1,000:1.

The polymerization is carried out, e.g., in an aprotic solvent, e.g., toluene or benzene, at a temperature ranging 50° C. to 100° C., e.g., 70° C.

The stereoblock poly(lactic acid) of the Example I is prepared by the method of the second embodiment.

Other stereoblock poly(lactic acid)s herein are prepared using other racemic aluminum alkoxide catalysts in place of catalyst (II).

We turn now to the third embodiment herein, that is the embodiment directed to preparing isotactic stereoblock poly (lactic) acid comprising polymerizing rac-lactide in the presence of a racemic catalyst consisting of:

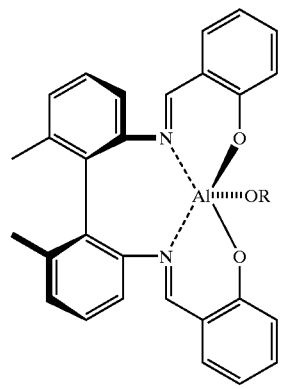
(III)

and the corresponding S-enantiomer, where R is $C_1$–$C_4$ alkyl which is straight chain or branched. In the catalyst, the R- and S-enantiomers are in a 1:1 ratio.

The method of the third embodiment is the same as the method of the second embodiment except for the catalyst.

The catalyst for the third embodiment can be prepared as follows. The ligand used to prepare the catalyst can be prepared according to the procedure described in Kanoh, S., et al., Polymer Journal 19, 1047–1065 (1987). The racemic catalyst is prepared, for example, by heating a solution of racemic ligand and the appropriate aluminum alkoxide in toluene.

Elements of the invention are described in a publication of Ovitt, J. M., et al., titled "Stereoselective Ring-Opening Polymerization of rac-Lactide with a Single-Site, Racemic Aluminum Alkoxide Catalyst: Synthesis of Stereoblock Poly(lactic acid)," Journal of Polymer Science: Part A: Polymer Chemistry, Vol. 38, 4686–4692 (2000), which is incorporated herein by reference.

The invention is illustrated by the following working examples:

EXAMPLE I

The catalyst used is the racemic catalyst consisting of (II) and the corresponding S-enantiomer wherein R is isopropyl.

The R-enantiomer of the catalyst is synthesized as follows:

The starting material, i.e., the ligand is (R)-SalBinapH$_2$ which has the formula:

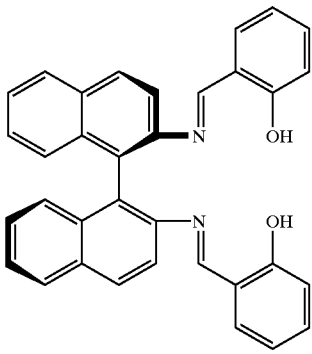

(R)-SalBinapH$_2$ can be obtained by the following reaction:

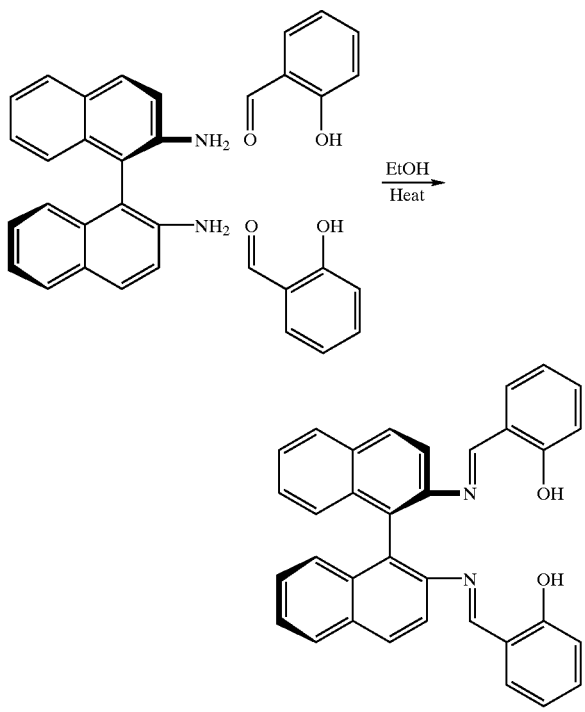

The ligand is converted into the R-enantiomer as follows: In a glove box, a dry Schlenk tube was loaded with freshly distilled aluminum isopropoxide (0.137 g, 0.671 mmol), (R)-SalBinapH$_2$ (0.329 g, 0.668 mmol), and toluene (10 mL). The mixture was heated to 70° C. and stirred for two days. The solvent was removed in vacuo, yielding a yellow solid.

The S-enantiomer was prepared by the same method as the R-enantiomer except that the ligand was (S)-SalBinapH$_2$.

The R-enantiomer was denoted (R)-1.

The S-enantiomer was denoted (S)-1.

The stereoblock polymer of the formula (I) was prepared as follows: In the drybox, a dry Schlenk tube was loaded with (R)-1 as a 0.0106 M solution in toluene (0.657 mL, 0.0069 mmol), (S)-1 as a 0.0117 M solution in toluene (0.592 mL, 0.0069 mmol), rac-lactide (0.199 g, 1.38 mmol), and toluene (6 mL). The flask was heated to 70° C. and stirred for 40 h. The reaction was quenched via rapid cooling with liquid N$_2$. The solvent was removed in vacuo, and the polymer was dissolved in CH$_2$Cl$_2$ and precipitated from cold MeOH. A white crystalline solid was isolated and dried in vacuo to a constant weight, with an isolated yield of 0.1985 grams.

The polymer obtained was isotactic poly(lactic acid) of the first embodiment herein having a M$_n$ of 22,600 grams per mole with an average of 11 lactide monomer units in each block. The melting point of the polymer was 179° C., which is higher than that of enantiomerically pure polymer, consistent with the cocrystallization of the enantiomeric blocks of the polymer.

EXAMPLE II

The catalyst used is the racemic catalyst consisting of (III) and the corresponding S-enantiomer.

Racemic ligand for preparing the catalyst, denoted rac-SalBiphenH$_2$ was prepared as follows: A 100 mL rb flask was loaded with 2,2'-diamino-6,6'-dimethylbiphenyl (AMB) (0.222 g, 1/04 mmol), salicyaldehyde (0.223 mL, 2.09 mmol), and absolute EtOH (12 mL). The reaction was heated to reflux with stirring under N$_2$ overnight. The reaction was allowed to cool to RT and the yellow solid was filtered, concentrated, and dried in vacuo to constant weight. Yield=0.339 g. $^1$H NMR (CDCl$_3$, 300 MHz: δ 12.30 (2H, s), 8.51 (2H, s), 7.39 (2H, t), 7.27 (2H, d, J=7.3), 7.21–7.24 (4H, m), 7.15 (2H, d, J=8.1), 6.79–6.84 (4H, m), 2.05 (6H, s).

The catalyst was prepared from the racemic ligand according to the general procedure used for catalyst preparation in Example I. In a glove box, a dry Schlenk tube was loaded with freshly distilled aluminum isopropoxide, rac-SalBiphenH$_2$ and toluene. The mixture was heated to 70° C. and stirred for two days. The solvent was removed, in vacuo, yielding a yellow solid. The catalyst was denoted rac-(SalBiphen)AlO$^i$Pr.

Stereoblock polymer of the formula (I) was prepared as follows. In the drybox, a dry Schenk tube was loaded with a solution of rac-(SalBiphen)AlO$^i$Pr in toluene, and rac-lactide (LA) with toluene being 0.2 M and [LA]/[Al] being 100. The flask was heated to 70° C. and stirred for 72 hours. The solvent was removed in vacuo, and the polymer was dissolved in CH$_2$Cl$_2$ and precipitated from cold MeOH. A conversion of 93% was achieved. The polymer exhibited a stereoblock microstructure. GPC revealed a M$_n$=29,560 grams per mole and a molecular weight distribution M$_w$/M$_n$=1.06. The polymer was semicrystalline and exhibited a peak T$_m$=178° C. and a T$_g$=28.2° C. The polymer contained an average of 10 lactide monomer units in each block.

Variations

Many variations of the above will be obvious to those skilled in the art. Thus the scope of the invention is defined by the claims.

What is claimed is:

1. Isotactic stereoblock poly(lactic acid) having a number average molecular weight ranging from 10,000 to 200,000 grams per mole with, on average, an equal number of poly (R) and poly (S) blocks of equal average number of monomer units where each block contains an average of 9 to 50 monomer units.

2. The isotactic stereoblock poly(lactic acid) of claim 1 having a M$_n$ of 22,600 grams per mole, with an average of 11 monomer units in each block.

3. The isotactic stereoblock poly(lactic acid) of claim 1 having a M$_n$ of 29,560 grams per mole, with an average of 10 monomer units in each block.

4. A method for preparing the isotactic stereoblock poly (lactic acid) of claim 1 which comprises polymerizing rac-lactide in the presence of a racemic catalyst consisting of:

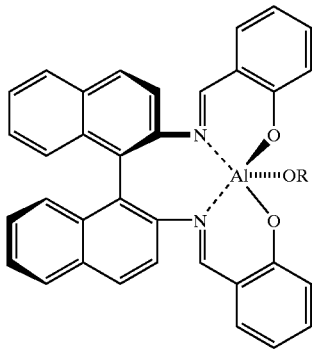

(II)

and the corresponding S-enantiomer, where R is $C_1$–$C_4$ alkyl which is straight chain or branched.

5. The method of claim 4 which is for preparing isotactic stereoblock poly (lactic acid) having a $M_n$ of 22,600 moles per gram with, on average, an equal number of poly (R) and poly (S) block where each block contains an average of 11 monomer units, where R in the catalyst is isopropyl.

6. A method of preparing the isotactic stereoblock poly (lactic) acid of claim 1 which comprises polymerizing rac-lactide in the presence of racemic catalyst consisting of:

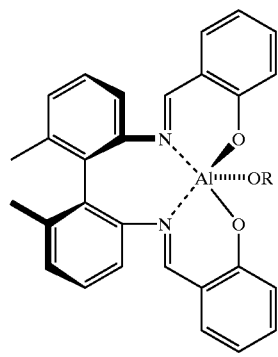

(III)

and the corresponding S-enantiomer, where R is $C_1$–$C_4$ alkyl which is straight chain or branched.

7. The method of claim 6 which is for preparing isotactic stereoblock poly (lactic acid) having a $M_n$ of 29,560 grams per mole, with, on average, an equal number of poly (R) and poly (S) blocks where each block contains an average of 10 monomer units, where R in the catalyst is isopropyl.

8. The isotactic stereoblock poly (lactic acid) of claim 1 with, on average, an equal number of poly (R) and poly (S) blocks where each block contains an average of 10 to 50 monomer units.

9. The method of claim 5 where the polymerization is performed at a temperature ranging from 50 to 100° C.

10. The method of claim 7 where the polymerization is performed at a temperature ranging from 50 to 100° C.

* * * * *